United States Patent [19]

Connor

[11] Patent Number: 4,881,942

[45] Date of Patent: Nov. 21, 1989

[54] COLORATION PROCESS FOR CELLULOSE POLYESTER TEXTILE BLENDS WITH A REACTIVE DYE CONTAINER A QUATERNARY NITROGEN SUBSTITUENT (E.G. NICOTINIC ACID) AND A DISPERSE DYE

[75] Inventor: Herbert G. Connor, Lancashire, England

[73] Assignee: Imperial Chemical Industries PLC, London, England

[21] Appl. No.: 217,122

[22] Filed: Jul. 7, 1988

Related U.S. Application Data

[63] Continuation of Ser. No. 84,854, Aug. 13, 1987, abandoned.

[30] Foreign Application Priority Data

Sep. 10, 1986 [GB] United Kingdom ............... 8621795

[51] Int. Cl.$^4$ .................... C09B 62/04; D06P 1/38; D06P 3/87
[52] U.S. Cl. .................................... 8/532; 8/529; 8/547; 8/549; 8/585; 8/673; 8/677; 8/684; 8/688; 8/918
[58] Field of Search ................. 8/532, 547, 673, 677, 8/684, 532, 547, 585, 673

[56] References Cited

U.S. PATENT DOCUMENTS

| 3,538,127 | 11/1970 | Schwander et al. | 8/547 |
| 3,639,398 | 2/1972 | Ponzini et al. | 8/547 |
| 4,017,256 | 4/1977 | Kogel et al. | 8/532 |
| 4,300,902 | 11/1981 | Connor | 8/529 |
| 4,453,945 | 6/1984 | Miyamoto et al. | 8/543 |
| 4,634,448 | 1/1987 | Ajioka et al. | 8/436 |
| 4,693,726 | 9/1987 | Meininger et al. | 8/547 |

Primary Examiner—A Lionel Clingman
Attorney, Agent, or Firm—Cushman, Darby & Cushman

[57] ABSTRACT

A process for the coloration of a union of polyester and cellulosic textile materials which comprises applying thereto a liquor or paste containing a disperse dye and a dye containing a cellulose reactive group having a quaternary nitrogen substituent, or the precursors of such a dye, and thereafter heating the textile material at such a temperature and for such a period as to fix the dye on the textile material, characterized in that the pH of the liquor or paste is from 5.8 to 8.0.

11 Claims, No Drawings

COLORATION PROCESS FOR CELLULOSE POLYESTER TEXTILE BLENDS WITH A REACTIVE DYE CONTAINER A QUATERNARY NITROGEN SUBSTITUENT (E.G. NICOTINIC ACID) AND A DISPERSE DYE

This is a continuation of application Ser. No. 07/084,854, filed Aug. 13, 1987, which was abandoned upon the filing hereof.

This specification describes an invention relating to a process for the coloration of a cellulosic textile material, and more especially to a union of polyester and cellulosic textile materials.

It is known from GB 2,051,139A that cellulosic materials can be colored by application, and subsequent fixation, of a dye containing a cellulose reactive group bearing a quaternary nitrogen substituent, or the precursors of such a dye, in the absence of an acid binding agent, i.e. at a pH of about 4.5 to 5.5. It is also known from the same document that a union of polyester and cellulosic materials can be colored by a mixture of such a dye and a disperse dye under the same conditions. It has now been surprisingly found that the quality and yield of colour on such a union textile material can be improved by raising the pH of the dye liquor or paste.

According to the present invention there is provided a process for the coloration of a union of polyester and cellulosic textile materials which comprises applying thereto a liquor or paste containing a disperse dye and a dye containing a cellulose reactive group having a quaternary nitrogen substituent, or the precursors of such a dye, and thereafter heating the textile material at such a temperature and for such a period as to fix the dye on the textile material, characterised in that the pH of the liquor or paste is from 5.8 to 8.0.

The cellulose reactive group is preferably a triazinyl group of the formula:

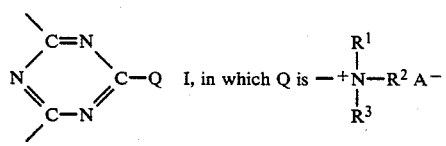

I, in which Q is $-\overset{+}{\underset{R^3}{\overset{R^1}{N}}}-R^2 \ A^-$ wherein $A^-$ is an anion and $R^1$, $R^2$ and $R^3$ are organic radicals or form part of an aromatic or non-aromatic ring, such as:

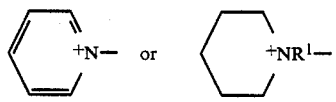

A dye having a quaternary ammonium substituent such as described above is well known and may be formed from a dye having a halotriazinyl group and a compound having a tertiary nitrogen atom (i.e. a quaternising agent). Such reactants constitute the hereinbefore mentioned "precursors.

The dye containing the reactive group having a quaternary nitrogen group, hereinafter called the "quaternary reactive dye", is preferably of the general formula:

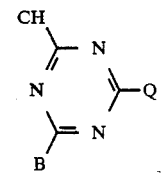

wherein
Ch is a chromophoric group, preferably linked to the triazine nucleus through an amino group, e.g. —NH— or —N(CH$_3$)—;
B is an inert substituent; and
Q is as hereinbefore defined.

The chromophoric group, Ch, is the chromophoric portion of a cellulosic reactive dye of the formula:

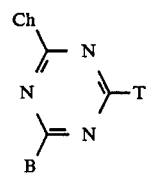

wherein B is as hereindefined and T is a halogen, preferably chlorine or fluorine. The dye of Formula III may be selected from any of the halotriazinyl cellulosic reactive dyes, for example those listed in the Colour Index.

As previously indicated, the group Q is derivable from a tertiary amine, and the quaternised dye may be formed in a previous manufacturing process, or in situ, i.e. in the dye liquor or print paste used in the present process, by reaction between the halotriazine precursor dye and a tertiary amine.

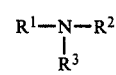

wherein $R^1$, $R^2$ and $R^3$ preferably individually or together form optionally substituted alkyl or alkenyl groups or, together with the nitrogen atom, an ali- or ara-monocyclic group, such a piperidyl or pyridyl. $R^1$, $R^2$ & $R^3$ may carry substituents such as hydroxy, amino, including substituted amino and halogen. Examples of suitable tertiary amines, hereinafter referred to as the "quaternising agent", are trimethylamine, triethylenediamine, triethanolamine, pyridine, morpholine, piperidine, methylpyridine and more especially carboxypyridines of the formula:

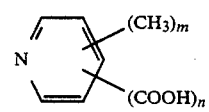

wherein m is 0 or 1 and n is 1 or 2. Especially preferred carboxypyridines are pyridine-3- and 4-carboxylic acids (nicotinic acid and isonicotinic acids respectively).

By "inert" in the inert substituent B is meant that B is unreactive to the textile material and all the other ingredients of the dye liquor or print paste. B is preferably hydroxy or optionally substituted alkoxy, phenoxy, alkylthio, phenylthio or amino. Examples of preferred groups represented by B are alkoxy such as methoxy, ethoxy, n-propoxy, i-propoxy, butoxy, alkoxyalkoxy such as 2-methoxyethoxy, 2-ethoxyethoxy, phenoxy, sulphophenoxy, amino, alkyl- and dialkyl-amino such as methylamino, ethylamino, butylamino, dimethylamino, diethylamino, methylethylamino, dibutylamino, and groups of these types substituted by a further group selected from OH, CN or SO₃H, such as 2-hydroxyethylamino, 2-hydroxypropylamino, 2-cyanoethylamino, di(2-cyanoethyl)amino, 2-sulphoethylamino; cycloalkylamino such as cyclohexylamino and cyclic amino such as morpholino, piperidino and piperazino, and optionally substituted phenyl and naphthylamino such as mono-, di- and tri-sulpho-naphthyl- and phenylamino.

Throughout this specification alkyl and alkenyl groups preferably contain up to four carbon atoms and homocyclic aryl groups are preferably phenyl.

The optionally substituted phenylamino group represented by B is preferably of the formula:

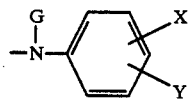 VI where G is H, methyl, ethyl, omega-sulphomethyl, 2-carboxyethyl, 2-hydroxyethyl or 2-cyanoethyl and X and Y are each independently selected from H, COOH, SO₃H, CH₃, C₂H₅, OCH₃, OC₂H₅, Cl, Br, CN, NO₂, NHCOCH₃ and beta-sulphatoethylsulphonyl.

As specific examples of such groups there may be mentioned anilino, o-, m- and p-sulphoanilino, o-, m- and p-carboxyanilino, 4- and 5-sulpho-2-carboxyanilino, 4- and 5-sulpho-o-tolylamino, 2,4-, 2,5- and 3,5-disulphoanilino, 2,4-dicarboxyanilino, 4- and 5-sulpho-2-methoxyanilino, o-, m- and p-sulpho-N-methylanilino, N-omega-sulphomethylanilino, 3-sulpho-N-(2-hydroxyethyl)anilino.

Alternatively the dye may be derived from a halotriazinyl dye of the formula:

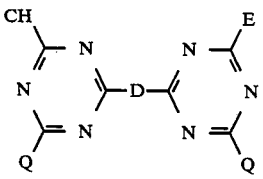 VII wherein
D is a diamino group derived from a diamine, DH₂;
E represents either B or Ch; and
Ch, B & Q are as herein defined.

Examples of the diamine, DH₂ which can provide the diamino group, D, are:

(i) Heterocyclic diamines, such as piperazine, (ii) Aliphatic diamines, e.g. alkylene-, hydroxyalkylene- or sulphatoalkylene-diamines especially those having 2 to 6 carbon atoms, such as ethylenediamine, 1,2- and 1,3-propylenediamines, 1,6-hexylenediamine, N-(2-hydroxyethyl)-ethylenediamine, 2-hydroxy-1,3-propylenediamine, 2-sulphato-1,3-propylenediamine, (iii) Other alpha- and omega-aliphatic diamines, such as triethylene tetramine and bis-(2-aminoethyl)ether, (iv) Naphthylenediamine sulphonic acids, such as 2,6-diaminonaphthalene-1,5- and 4,8-disulphonic acids and 1,5-diaminonaphthalene-3,7-disulphonic acid, (v) Diamine derivatives of mono- and di-cyclic compounds of the benzene series, e.g. phenylene diamines and their mono- and disulphonic acids, such as 1,3- and 1,4-phenylenediamines, 1,3-phenylenediamine-5-sulphonic and 4,6-disulphonic acids, 1,4-phenylenediamine-2-sulphonic and 2,5-disulphonic acids, (vi) Diamines of the formula:

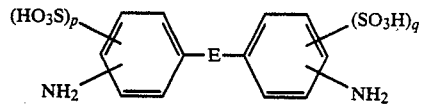

where p and q are each 0 or 1 and E is a direct link or a group selected from SO₂, OCH₂, C₂H₂, C₂H₄, NH, NHCONH, such as
4,4′-diaminostilbene-2,2′-disulphonic acid,
benzidine-2-sulphonic and 2,2′-disulphonic acids,
3,3′- and 4,4′-diaminodiphenylureas,
4,4′-diaminodiphenylurea-2,2′- and 3,3′-disulphonic acids,
4,4′-diaminodiphenylamine-2,2′-disulphonic acid,
4,4′-diaminodiphenylmethane,
4,4′-diaminodiphenylmethane-2,2′-disulphonic acid,
4,4′-diaminodiphenylether, 4,4′-diaminodiphenylsulphone,
4,4′-diaminodiphenylethane-2,2′-disulphonic acid, and (vii) The N-alkyl and N,N′-di(alkyl) derivatives of the aforementioned diamines, such as 4-(N-methylamino)- and 4-(N-ethylamino)-2-sulphoaniline and 4,4′-di(N-methylamino)-2,2′-disulphodiphenylamine.

Any disperse dye may be used including those listed in the Colour Index but a preferred disperse dye is one which can be removed from the cotton portion of the blend by a simple alkaline wash. Examples of such disperse dyes are those which contain one or two ester groups capable of saponification under alkaline conditions. On treatment with alkali the ester moiety is converted into the equivalent water-soluble carboxylate salt which is readily removed from the textile material by washing with water.

The disperse dye and the quaternary reactive dye, or the precursors thereof, are usually applied to the union textile material from an aqueous medium. This may be in the form of a dye bath, containing the usual adjuncts, such as dyeing assistants, or a print paste, containing the usual adjuncts, such as thickening agents. The dye liquor or print paste preferably contains from 1 to 25% by weight of the dye.

The pH of the dyebath or print paste is desirably at least 6.0, preferably from 6.5 to 7.6 and more preferably 6.9 to 7.6. It is conveniently adjusted, from the natural pH of the other ingredients (generally around 5.5 or below), by the addition of an alkaline agent such as an alkali metal hydroxide or salt with a weak acid, such as an alkali metal carbonate or bicarbonate. If a carbonate or bicarbonate is used, this is preferably added to the print paste before the thickening agent to avoid the evolution of carbon dioxide into the thickened paste, as gas bubbles can adversely affect the properties of the print paste.

It is generally more convenient to dry the union textile material before subjecting it to the high temperature treatment. Convenient conditions for dyed material are infra red drying down to 30% moisture followed by 1 minute at 110° C. Printed material is conveniently dried at 100°–160° C., typically for 30 seconds at 140° C. after a rotary screen printing process.

The high temperature treatment is conveniently performed at 160°–250°, preferably 170°–215° C., and preferably comprises a 1-minute exposure to dry heat at 200° C. or a 10-minute exposure to steam at 170°–180° C. After the heat treatment, the union textile material is preferably subjected to the usual alkaline washing treatments to remove unfixed dye.

In a preferred form of the process, urea is added to the ingredients of the dyebath or print paste, preferably in the range from 2% to 20%, more preferably 2% to 6%, by weight based on the total weight of the ingredients, in order to improve the depth of coloration on the union textile material. An alternative to urea, though generally less effective, is dicyanamide in the range 1–3% by weight.

The process of the present invention leads to a surprising improvement in the the quality and yield of colour on the union textile material.

The invention is further illustrated by the following Examples in which all parts and percentages are by weight unless otherwise indicated.

EXAMPLE 1

A series of print pastes were prepared for each of two dyes (Dye 1 & Dye 2) in accordance with the following recipes:

| Ingredients | Dye 1 | Dye 2 |
| --- | --- | --- |
| Dye # | 15 | 20 |
| Thickener* | 50 | 50 |
| Urea | 10 | 10 |
| Nicotinic Acid | x | x |
| NaHCO$_3$ | y | y |
| Water | 25 − (x + y) | 20 − (x + y) |
|  | 100 | 100 | using the quantities of nicotinic acid (x) and NaHCO$_3$ (y) indicated in Table 1. The nicotinic acid and NaHCO$_3$ were dissolved in water and the urea and thickening agent added to the solution followed by the required quantity of dye. The paste was then adjusted to 100 parts with water.

TABLE 1

| Print Paste | 1 | 2 | 3 | 4 | 5 | 6 | 7 | 8 |
| --- | --- | --- | --- | --- | --- | --- | --- | --- |
| Nicotinic acid (x) | — | 0.5 | — | 0.5 | 0.5 | 0.5 | 0.5 | 0.5 |
| NaHCO$_3$ (y) | — | — | 0.4 | 0.4 | 0.6 | 0.8 | 1.0 | 1.2 |

The pH of each print paste was measured using a pre-calibrated pH meter. The print pastes were roller printed as stripes by roller onto a sample of 50/50 polyester/cotton and fixed by high temperature steaming for 10 minutes at 180° C. The fixed prints were subjected to alkaline washing to remove unfixed dye and dried.

The dyes used were as follows:

Dye 1

A red shade mixture of a finely divided disperse dye and two monochlorotriazine cellulose reactive dyes containing the usual adjuvants such as dispersants, humectants, thickening agents, antibacterials, buffers, solubilising agents and water which make up the remainder of the formulation:

| % | Dye |
| --- | --- |
| 6.61 | 3-acetylamino-4-(4-nitrophenylazo)-N,N—di(2-[methoxycarbonyl]-ethyl)aniline |
| 4.02 | 2-chloro-4-amino-6-(3-ureido-4-[3,6,8-trisulphonaphth-2-ylazo]-phenylamino)-1,3,5-triazine |
| 9.91 | 2-chloro-4-(2-methylphenylamino)-6-(3,6-disulpho-7-[2-sulphophenylazo]-8-hydroxynaphth-1-ylamino-1,3,5-triazine |

Dye 2

A blue shade mixture of a finely divided disperse dye and a bis-monochlorotriazine cellulose reactive dye containing the usual adjuvants such as dispersants, humectants, thickening agents, antibacterials, buffers, solubilising agents and water which make up the remainder of the formulation:

| % | Dye |
| --- | --- |
| 4.07 | 4-(3,5-dinitrothien-2-ylazo)-N,N—di(2-acetoxyethyl)aniline |
| 13.57 | 1-amino-2-sulpho-4-(2,4,6-trimethyl-3-sulpho-5-[4-chloro-6-(beta-(4-chloro-6-[2,5-disulphophenylamino]-1,3,5-triazin-2-yl-amino)ethylamino)triazin-2-ylamino]phenylamino)-anthraquinone |

*The thickener used was 10% aqueous solution of Manutex F adjusted to pH 6.7 with NaOH solution.

The dried prints from each series of print pastes were assessed for colour yield and shade with respect to the print derived from Print Paste 4. Results of measurements of pH of the print pastes and of the assessments of colour yields and shades of the prints are given in Table 2.

TABLE 2

| Print paste | 1 | 2 | 3 | 4 | 5 | 6 | 7 | 8 |
| --- | --- | --- | --- | --- | --- | --- | --- | --- |
| Dye 1 |  |  |  |  |  |  |  |  |
| pH | 6.7 | 5.2 | 7.3 | 6.9 | 7.4 | 7.6 | 7.7 | 7.6 |
| Yield | 35 | 83 | 63 | 100 | 100 | 121 | 128 | 145 |
| Shade | d,ch | d,r | d,r | ref | br | br,y | br,y | br,y |
| Dye 2 |  |  |  |  |  |  |  |  |
| pH | 6.9 | 5.3 | 7.4 | 6.9 | 7.2 | 7.4 | 7.5 | 7.6 |
| Yield | 35 | 81 | 80 | 100 | 112 | 111 | 127 | 127 |
| Shade | d,ch | d,g | d,r | ref | br,r | br,r | br,r | br,r |

In Table 2:
d = duller
br = brighter
ch = chalky
r = redder
y = yellower
g = greener
ref = reference for shade determination

I claim:

1. A process for the coloration of a union of polyester and cellulose textile materials which comprises applying thereto a dye liquor or print paste containing a disperse dye and a dye containing a cellulose reactive group having a quaternary nitrogen substituent, or the precursors of such a dye, and thereafter heating the textile material at a temperature in the range from 160° to 250° C. to fix the dye on the textile material, the pH of the liquor or paste being in the range from 5.8 to 8.0 due to the presence of an alkaline agent therein.

2. A process according to claim 1 wherein the cellulose reactive group is a triazinyl group of the formula:

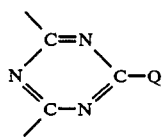

in which Q represents a group of the formula:

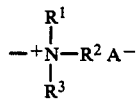

wherein $A^-$ is an anion and $R^1$, $R^2$ and $R^3$ are organic radicals or form part of an aromatic or non-aromatic ring.

3. A process according to claim 1 wherein the dye containing a cellulose reactive group has the general formula:

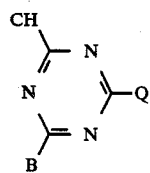

wherein

Ch is a chromophoric group;

B is an inert substituent; and

Q represents a group of the formula:

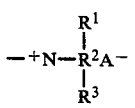

wherein $A^-$ is an anion and $R^1$, $R^2$ and $R^3$ are organic radicals or form part of an aromatic or non-aromatic ring.

4. A process according to claim 1 wherein the dye containing a cellulose reactive group has the formula:

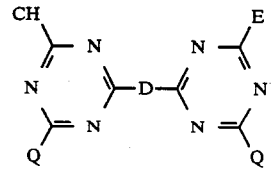

wherein

D is a diamino group derived from a diamine, $DH_2$;

E represents either an inert substituent or a chromophoric group; and

Ch is a chromophoric group and Q represents a group of the formula:

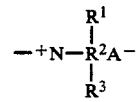

wherein $A^-$ is an anion and $R^1$, $R^2$ and $R^3$ are organic radicals or form part of an aromatic or non-aromatic ring.

5. A process according to any of claims 2 to 4 wherein Q is a group of the formula:

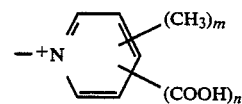

wherein m is 0 or 1 and n is 1 or 2.

6. A process according to claim 5 wherein Q is a group of the formula:

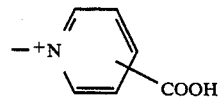

wherein the carboxy group is in the 3- or 4-position relative to the quaternary nitrogen.

7. A process according to any of the preceding claims wherein the disperse dye is removable from the cellulosic textile material by a simple alkaline wash.

8. A process according to any of the preceding claims wherein the pH of the liquor or paste is at least 6.0.

9. A process according to claim 8 wherein the pH of the liquor or paste is in the range 6.5 to 7.6.

10. A process according to claim 9 wherein the pH of the liquor or paste is in the range 6.9 to 7.6.

11. A process according to any of the preceding claims wherein the liquor or paste contains urea.

* * * * *